Feb. 16, 1937.  H. L. SCHROEDER  2,070,928
BAKER'S PEEL
Filed Oct. 5, 1933
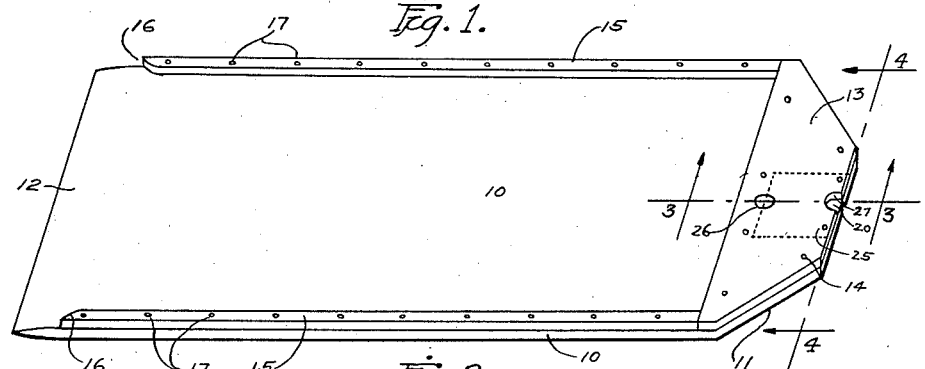
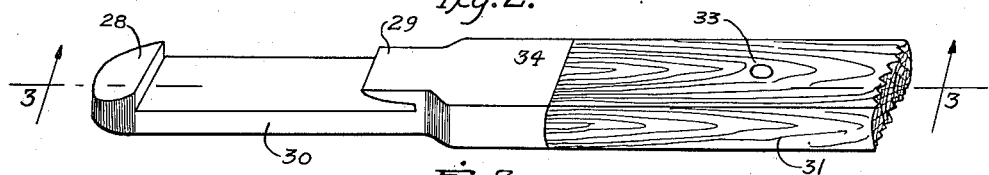
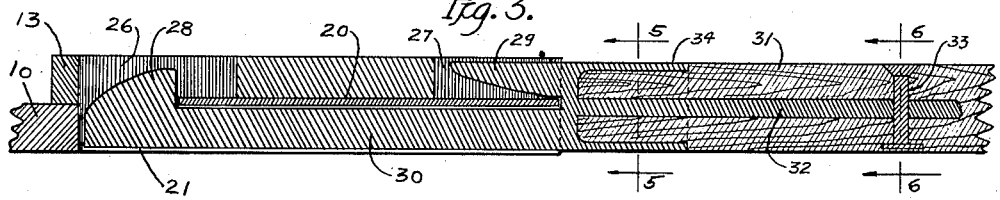
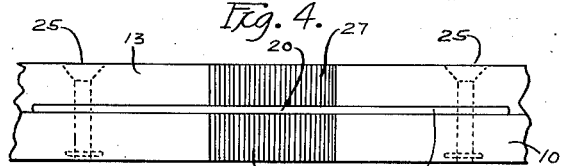
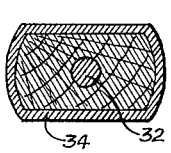
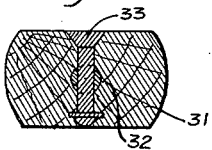
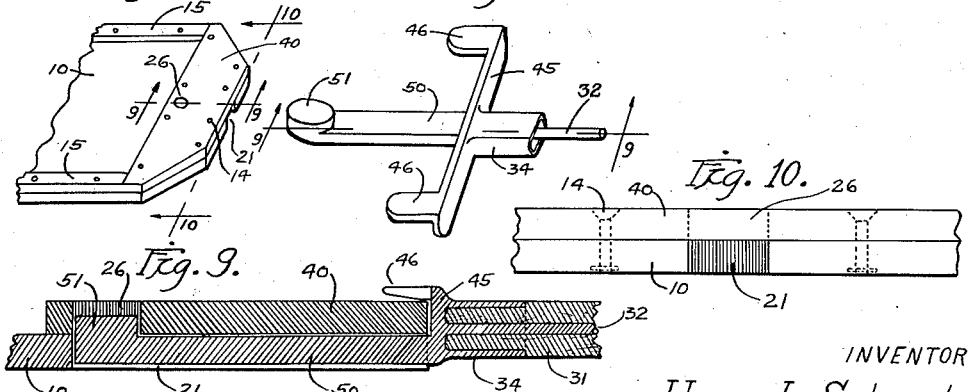
INVENTOR
Henry L. Schroeder.
BY Arthur T. Brink
ATTORNEY
WITNESS:
Otto Schroeder Patented Feb. 16, 1937

2,070,928

UNITED STATES PATENT OFFICE 2,070,928

BAKER'S PEEL

Henry L. Schroeder, Chicago, Ill.

Application October 5, 1933, Serial No. 692,250

2 Claims. (Cl. 107—67)

The invention relates to improvements in bakers' peels or more specifically to bakers' peels for handling bread and analogous bakery products for proofing purposes, such devices being commonly referred to as proofing peels.

It is the primary object of the present invention to generally improve the construction of a proofing peel usually made for the most part of wood with certain metallic reenforcing connections of the nature of the improved handle connections herein described, and it is a further object of the invention to generally improve the construction of a proofing peel blade to render the same more economical to produce and more efficient in use for its intended purpose of proofing bread and analogous bakery products.

It is a further object of the invention to provide an improved construction of proofing peel blade of wood suitably reenforced for strengthening purposes and for reenforcing and supplementing the load carrying face of the peel blade.

It is a further object of the invention to provide improved handle and handle attaching means for use in bakers' peels whereby strength and efficiency is imparted to the heel plate and particularly to the handle attaching portion thereof and whereby the handle is enabled to be constructed of suitable heat insulating material in the maximum degree to prevent the possibility of burns to the hands of an operator in using the handle for manipulating the peel blades.

It is a further object of the invention to generally improve the construction of a wood peel blade of the bread proofing type whereby the heel portions and the lateral edges of the peel blade are reenforced and strengthened to permit the use of relatively thin body portions of material in the blade and to prevent loss of loaves from sliding off the loaf engaging portions of the blade.

It is a further object of the invention to further improve the metallic reenforcing handle engaging portions on the heel end of a baker's peel and upon the detachable handle device for use in connection therewith.

It is a further object of the invention to provide in a wood peel blade of the bread proofing type a wood blade of the maximum degree of lightness and thinness presenting a flush bottom surface to the oven and a reenforced loaf protective, loaf carrying area on the normal upper and loaf carrying surface of the blade.

It is a further object of the invention to provide an improved construction of wooden baker's peel blade of the bread proofing type that shall be efficient and durable, made of the minimum amount of material to secure lightness and economy in construction.

It is a further object of the invention to provide an improved construction of wooden bakers' peel blades of the bread proofing type that shall be light and easy to handle and that may be made of relatively thin portions of wood of a single thickness or lamina if desired and thoroughly braced to prevent warping.

It is a further object of the invention to provide an improved wooden baker's peel blade provided with a lower smooth oven contacting surface and an upper bread carrying surface reenforced and protected along the longitudinal side edges and at the heel thereof for the purpose of efficiency in retaining and carrying loaves of bread while retained in metallic skeleton pans and the like.

Other objects of the invention will appear from the following description of the preferred form thereof as depicted in the drawing forming a part of the specification, the novel features being set forth in the appended claims.

In the said drawing:

Fig. 1 is a perspective view showing the upper and top or loaf carrying surface of the blade.

Fig. 2 is a broken perspective view of the blade engaging end of the handle, and Fig. 3 is a detail, longitudinal, sectional view through the handle when in operative position on the heel end of the blade, the view in Fig. 3 being taken substantially along the respective lines 3—3 of Figs. 1 and 2 looking in the directions indicated by the arrows.

Fig. 4 is a fragmentary end elevation view.

Fig. 5 and Fig. 6 are transverse, detail, sections through the handle structure on lines 5—5 and 6—6 of Fig. 3.

Figs. 7 to 10 inclusive illustrate modified constructions at the heel end of my blade and a modified form of detachable handle connection for use in connection therewith, Fig. 7 being a fragmentary perspective view of the heel end of the modified blade and Fig. 8 a perspective view of the metallic connection on the blade engaging end of the handle. Fig. 9 is a longitudinal, sectional view through the handle taken approximately on line 9—9 of Fig. 8 looking in the direction indicated by the arrows and the view showing a fragmentary portion of the wood handle in section but omitted from Fig. 8. Fig. 10 is a fragmentary detailed, end elevation of the peel blade, being taken on line 10—10 of Fig. 7 looking in the direction indicated by the arrows.

In the form of the peel blade and handle shown in Figs. 1 to 6 inclusive, the reference character 10 designates the wood body of the blade which may be made of a single, relatively thin wood board or may be made of composite strips suitably united by glue joints and the like or it may be made of laminated portions to produce a veneer section that may be formed as indicated by the blade body portion 10 which is cut away at the corners as indicated at 11 from the heel portion of the blade while at the forward end or the point it may be bevelled as indicated at 12 (Fig. 1) for ease in handling the loaves or loaf carrying devices.

At the heel end of the blade 10 on the upper or loaf carrying surface thereof, I provide the transverse reenforcing strip 13 which may be united to the blade strip 10 by means of suitable rivets as designated at 14. In the embodiment shown, the transverse reenforcing strip 13 is shown as substantially of the same thickness at the heel end of the body portion of the blade 10 and the transverse strip 13 is cut away diagonally at the corners to correspond with the cut away corner portions 11 of the blade body heretofore described.

On the upper surface of the blade body portion 10 along the lateral edges and abutting the plate 13 are secured optional retaining strips 15, preferably of wood about the thickness of the transverse strengthening member 13, the same being placed in abutting relation to the transverse strengthening strip 13 and at their outer extremities adjacent the point of the blade body portion 10 they are cut around at an angle as indicated at 16 and terminate short of the extreme outer end of the blade or at about the portion thereof where the bevel for the point begins. These strips 15 may be secured by rivets 17 extending therethrough and into and through the body of the blade portion 10 similar to the before described rivets 14, and in conjunction with the transverse heel reenforcing member 13 they afford an efficient means for retaining loaves of bread, especially when held in shallow metallic retainers or frames in position upon the peel and effectually preventing losses or injury to the molded loaves.

Heretofore in the construction of wood blade peels it has been proposed to slot the heel end of the blade through from one flat side to the other thereof and to provide a kerf or cut intermediate of the flat sides of the blade and the insertion of a metallic handle engaging plate and my improved construction at the heel end of the blade utilizing the transverse attachable strengthening portion makes it possible to greatly improve the handle engaging device on the blade which is attained by the attachment of a relatively short, metallic handle plate designated by the reference character 20 (Figs. 1, 3 and 4). The plate 20 may be placed in position as indicated in the drawing after the reentrant handle slot 21 is formed in the material in the heel end of the blade portion 10 intermediate the longitudinal side edges thereof and the construction permits the plate 20 to be merely laid flush with the top face of the body portion 10 in the manner shown most clearly in Figs. 3 and 4 after which the transversely extending strengthening wood strip 13 with the grain thereof extending transversely of the longitudinal extension of the blade, may be placed in the position indicated and both strip and metallic plate 20 firmly and permanently secured to the body portion 10 of the blade by means of the rivets 25 which are similar to the before described rivets 14 having the head or terminal portions thereof preferably located flush with or below the outer surfaces of the parts 10 and 13. The transverse strengthening wood member 13 will be bored or cutaway at 26 just beyond the innermost edge of the metallic plate 20 and at the innermost extremity of the before mentioned handle groove 21 in order to accommodate the metallic engageable portion 30 of the detachable handle.

The wood of the strip 13 on the upper side of the plate 20 will be recessed as indicated at 27, Figs. 1, 3 and 4, thus exposing the inner edge of the plate 20 and the lower surface thereof as well as that part of the upper surface of the plate within the notched or cutaway portion 27 so that the convention form of plate engaging projections 28 and 29 on the handle casting 30 may co-operate with the heel end of the blade for attachment and detachment in the manner illustrated most clearly by the assembled and co-acting parts of the handle and the plate as shown in Fig. 3 where the overhanging projection 29 of the handle casting is shown to engage within the recess 27 over the top of the plate 20, while the forwardly and upwardly projecting part 28 effectively engages the forward edge of the plate to enable the blade to be manipulated in the conventional manner by the handle, the wood body portion of which is indicated at 31, and which is shown as provided with a central, longitudinal bore for taking a projecting spindle 32 formed on the handle casting 30 and held in position in the wood of the handle 31 by one or more rivets 33 (Figs. 2 and 6).

The metallic engaging hook portion of the handle 30 is preferably provided with an integral ferrule 34 surrounding the inner end of the spindle 32 serving as an effective socket and protective device for the inner extremity of the wood handle 31.

In the modified form of my invention appearing in Figs. 7 to 10 inclusive, the heel slotted body portion 10 of the blade may be provided with the optional lateral reenforcing side edge strips 15 abutting the transverse heel reenforcing wood strip 40 which is constructed similarly to the before described transverse strips 13. The heel end of the blade 10, slotted at 21, is in this modification of the device used without the metallic reenforcing strip 20 but the terminus of the slot 21 is partially covered by the strip 40 which, however, is bored at 26 as in the case of the transverse strip 13 and a specially constructed, metallic handle member for engagement with the peel blade is provided, the same having the conventional wood handle portion 31 before described fitting into the ferrule 34 around the central spindle 32. This casting is otherwise modified to provide a transverse member 45 with forwardly projecting lugs 46 engageable over the top of the transverse wood strip 40 in the manner indicated in Fig. 9, there being a forwardly projecting shank portion 50 terminating in an upwardly projecting lug or boss 51 adapted to engage in the aforesaid opening 26 in plate 40 in the manner shown in Fig. 9. This construction affords an efficient and economical form of detachable connection between the handle and the blade and one that is renewable readily by the mere replacement of the wood strip 40 which would take the major portion of any wear in the manipulation of the device. However, experience has shown that the wood transverse strip 40 when used in conjunction with the handle of the described character will last almost indefinitely and substantially during the life of the peel blade.

My improved construction of peel blade consisting of the relatively thin body portion 10 with the transverse reenforcing heel member 13 on the top of the blade and the optional lateral reenforcing top side strips 15 results in a decided improvement in the construction of proofing peel blades in that a thinner blade body may be used which is not only lighter and easier to handle but it is stronger and not so liable to warping, but the thinner blade is found to have a decided tendency to reduce the amount of crippled and deformed loaves and to produce in the baked bread a better under crust as the drop from the top surface of the peel to the oven hearth when the bread has been proofed and is ready to be delivered to the oven is greatly reduced.

Furthermore, the flush bottom construction of the blade 10 presenting a smooth surface to the oven bottom produces an even riding peel and one that has no tendency toward vibration or wabbling. Moreover, my improved, detachable handle attaching structure is firm, solid and efficient, the attachable handle device being adapted for easier and quicker operation and the wood of the handle being carried down to the short ferrule 34 adjacent the point of attachment of the handle hook with the peel body has a tendency to insulate the handle so efficiently as to render accidental burning of the operator's hands unlikely since the metallic part of the handle connection is concealed by the overlapping portions of the wood handle.

Under ordinary conditions where bread is proofed in the conventional type of metal pans, the upper transverse guide member 13 at the heel end of the blade will be found sufficient for guiding the loaves on the peel by the lateral guide strips 15 and a decided advantage in preventing loss and injury to the loaves where the new style, square cornered rye bread loaves are proofed in metal molds which have a tendency towards sidewise slippage upon the peel that may result in crippling or injuring the loaf when the ends of the same are allowed to slip and protrude laterally from the sides of the peel blade.

In order that the invention might be understood, the details of the preferred embodiment have been specifically described but it is not desired to be limited to such details except as set forth in the claims for it will be apparent that persons skilled in the art may resort to various modifications without departing from the purpose and spirit of my invention.

I claim:

1. A baker's peel comprising a relatively thin, rectangular body portion reenforced at the heel end by a transverse reenforcing strip secured upon the upper surface thereof and being provided at the heel end with a reentrant handle hook slot, the transverse reenforcing member being cut away at the inner extremity of the reentrant handle hook slot to provide handle engaging means thereon, a thin handle engaging plate secured between the body and the strip and having a portion spanning the slots thereof, and a metallic, detachable handle hook comprising a longitudinally extending metallic member with a terminal, angularly extending lug or boss, a transversely extending member integrally attached therewith and spaced from the aforesaid terminal lug or boss and being provided at its extremities with inwardly extending lugs adapted for engagement with the upper surface of the said transversely extending reenforcing member whereby to form a quick detachable handle engaging connection between the said handle and the said peel blade.

2. In a baker's peel, the combination with a peel blade provided at the heel end thereof with a reentrant handle hook slot and a transverse reenforced member secured to the heel end of the blade over the said slot, a handle attachment plate secured to and between the blade and the member and bridging the slot, and a detachable handle device comprising a metallic hook member adapted for engagement with the plate bridging the said reentrant slot in the peel blade body, the said metallic handle hook being provided with a pair of spaced-apart opposing lugs for detachably engaging the said transverse reenforcing member bridging the said reentrant slot, and means for securing a heat insulating handle member to the said metallic handle hook comprising a relatively short ferrule integral with the said handle hook and a spindle centrally arranged and secured within the said ferrule for impaling the insulating material of the said handle member.

HENRY L. SCHROEDER.